United States Patent [19]
Takabatake

[11] Patent Number: 5,806,915
[45] Date of Patent: Sep. 15, 1998

[54] SUPPORT STRUCTURE FOR SUPPORTING FOAMABLE MATERIAL ON HOLLOW STRUCTURAL MEMBER

[75] Inventor: Yoshihiro Takabatake, Toyota, Japan

[73] Assignee: NEO-EX Lab. Inc., Toyota, Japan

[21] Appl. No.: 597,968

[22] Filed: Feb. 7, 1996

[30] Foreign Application Priority Data

Sep. 2, 1995 [JP] Japan .................................. 7-021936
Sep. 11, 1995 [JP] Japan .................................. 7-291206

[51] Int. Cl.⁶ .................................................. B62D 29/04
[52] U.S. Cl. .......................................... 296/187; 296/901
[58] Field of Search .................................... 296/187, 205, 296/901; 277/26, 166, 178, 12

[56] References Cited

U.S. PATENT DOCUMENTS

| | | | |
|---|---|---|---|
| 3,956,549 | 5/1976 | Stoeberl | 428/71 |
| 4,898,630 | 2/1990 | Kitoh et al. | 156/79 |
| 4,901,395 | 2/1990 | Semrau | 16/2 |
| 4,989,913 | 2/1991 | Moore, II | 296/205 |
| 5,040,803 | 8/1991 | Cieslik et al. | 277/12 |
| 5,213,391 | 5/1993 | Takagi | 296/205 |
| 5,344,208 | 9/1994 | Bien et al. | 296/287 |
| 5,631,027 | 5/1997 | Takabatake | 425/4 R |
| 5,642,914 | 7/1997 | Takabatake | 296/187 |

FOREIGN PATENT DOCUMENTS

| | | | |
|---|---|---|---|
| 2-276836 | 11/1990 | Japan . | |
| 4-110280 | 4/1992 | Japan | 296/187 |
| 5-319305 | 12/1993 | Japan | 296/205 |

*Primary Examiner*—David M. Mitchell
*Attorney, Agent, or Firm*—Dennison, Meserole, Pollack & Scheiner

[57] ABSTRACT

A support structure for supporting a foamable material in a cavity of a hollow structural member so that the foamable material blocks the cavity of the hollow structural member when it is foamed by external heating. The support structure includes a support member disposed in the cavity so as to be perpendicular to a longitudinal direction of the cavity and adapted to retain the foamable material in such a manner that at least one side surface of the foamable material is restrictively covered by the support member, and an engagement pin integrally provided on the support member and adapted to engage an aperture formed in the hollow structural member.

8 Claims, 7 Drawing Sheets

SUPPORT STRUCTURE FOR SUPPORTING FOAMABLE MATERIAL ON HOLLOW STRUCTURAL MEMBER

BACKGROUND OF THE INVENTION

1. Field of the Invention

The present invention relates to a support structure for supporting a foamable material on a hollow structural member, and more particularly to a support structure for supporting a foamable material in a cavity of a closed box-like hollow structural member constituted of two pieces of plates, such as a pillar, a rocker panel and a roof side panel of a vehicle body, in order that the foamable material blocks the cavity of the hollow structural member to increase damping powers, sound insulation powers and other powers of the hollow structural member when it is foamed by external heating.

2. Description of the Prior Art

FIG. 10 exemplarily shows a conventional support structure. In this support structure, to support a foamable material 121 in a cavity 106 of a pillar 101 as a hollow structural member, a bolt 111 having a threaded section 111a is mounted on an inner pillar panel 102 so that the threaded section 111a is projected into the cavity 106 at a desired length. The threaded section 111a is then provided with a washer 120. The foamable material 121 is engaged with the threaded section 111a by sticking so as to be seated on the washer 120. Thus, the foamable material 121 is supported in a cavity 106 of the pillar 101.

Such a support structure of the foamable material as described above is disclosed, for example, in Japanese Laid-Open Patent Publication No. 2-276836 (corresponding to British Patent Application No. 8903211.4).

In the above-noted conventional support structure of the foamable material in which the foamable material 121 is engaged with the threaded section 111a of the bolt 111 projected into the cavity 106 of the pillar 101, the foamable material 121 is unrestrictively expanded in all directions when it is foamed and expanded by heating externally of the pillar 101. Therefore, as shown in FIG. 11, the foamable material 121, when heated by external heating, is foamed and expanded to form a foamed product 122 which is unnecessarily elongated in a longitudinal direction of the the cavity 106.

Thus, to sufficiently block the cavity 106 by the foamed product 122, the foamable material 121 has to be extremely increased in amount. This may lead to increased cost.

SUMMARY OF THE INVENTION

It is an object of the invention to provide a support structure for supporting a foamable material in a cavity of a hollow structural member in which the problems associated with the conventional support structure can be eliminated.

It is another object of the invention to provide such a support structure in which the cavity can be efficiently blocked without increasing the amount of the foamable material.

It is a further object of the invention to provide such a support structure in which the foamable material can be easily and reliably positioned in the cavity.

In order to attain these objects, the present invention provides a support structure for supporting a foamable material in a cavity of a hollow structural member so that the foamable material blocks the cavity of the hollow structural member when it is foamed by external heating, which includes a support member disposed in the cavity so as to be perpendicular to a longitudinal direction of the cavity and adapted to retain the foamable material in such a manner that at least one side surface of the foamable material is restrictively covered by the support member, and an engagement pin integrally provided on the support member and adapted to engage an aperture formed in the hollow structural member.

With this support structure, the foamable material is retained on the support member in such a manner that at least one side surface thereof is restrictively covered by the support member. The support member for retaining the foamable material is disposed in the cavity of the hollow structural member so as to be perpendicular to the longitudinal direction of the cavity. Therefore, when the foamable material is foamed and expanded by external heating, the support member prevents the at least one side surface of the foamable material from expanding in the longitudinal direction of the cavity, and this causes the foamable material to be effectively foamed and expanded in the directions perpendicular to the longitudinal direction of the cavity. As a result, the foamable material may be reliably adhered to an inner circumferential surface of the hollow structural member to efficiently block the cavity.

Further, the support member for retaining the foamable material is disposed in the cavity of the hollow structural member only by inserting the engagement pin provided thereon into the aperture formed in the hollow structural member. Thus, the foamable material can be easily and reliably positioned in the cavity.

The support member may be constituted of a support plate on which at least one support strip is integrally provided to position and retain the foamable material thereon. With this construction, the support strip prevents the foamable material from moving on and dropping out from the support plate. This may effectively eliminate inadequate foaming of the foamable material due to moving or dropping out of the foamable material.

The at least one support strip may be two in number and may be provided on respective wall surfaces of the support plate. With this construction, the foamable material can be selectively positioned and retained on either wall surface of the support plate. Further, an additional foamable material can be used so that the two foamable materials are retained on both wall surfaces of the support plate, if required.

The support member may be constituted of a pair of support plates so as to restrictively cover both side surfaces of the foamable material. With this construction, when the foamable material is foamed and expanded by external heating, the support plates prevent the both side surfaces of the foamable material from expanding in the longitudinal direction of the cavity, and this causes the foamable material to be more effectively foamed and expanded in the directions perpendicular to the longitudinal direction of the cavity. As a result, the foamable material may be more reliably adhered to the inner circumferential surface of the hollow structural member.

The support member and the engagement pin may be integrally formed by injection molding of synthetic resin. Such a construction permits a reduced number of elements and simplified processes for incorporating the foamable material to the hollow structural member.

The aperture may have a non-circular configuration to prevent the engagement pin from rotating therein. This construction prevents the support member from inadvertently rotating.

The distance between the support plates may be partially increased at an area adjacent to the engagement pin so as to be greater than the dimension of the engagement pin. With this construction, when the foamable material is foamed and expanded, a part of a foamed product as produced covers up the engagement pin and closes the aperture.

The pair of support plates and the foamable material may be provided with a desired number of small apertures and projections engageable with the small apertures to suitably position and retain the foamable material between the support plates. This construction prevents rotation and dropping out of the foamable material.

The present invention will become more fully apparent from the following description as it proceeds in connection with the drawings.

DETAILED DESCRIPTION OF THE PREFERRED EMBODIMENTS

Preferred embodiments of the invention will now be described in detail with reference to the drawings.

Figure 1:
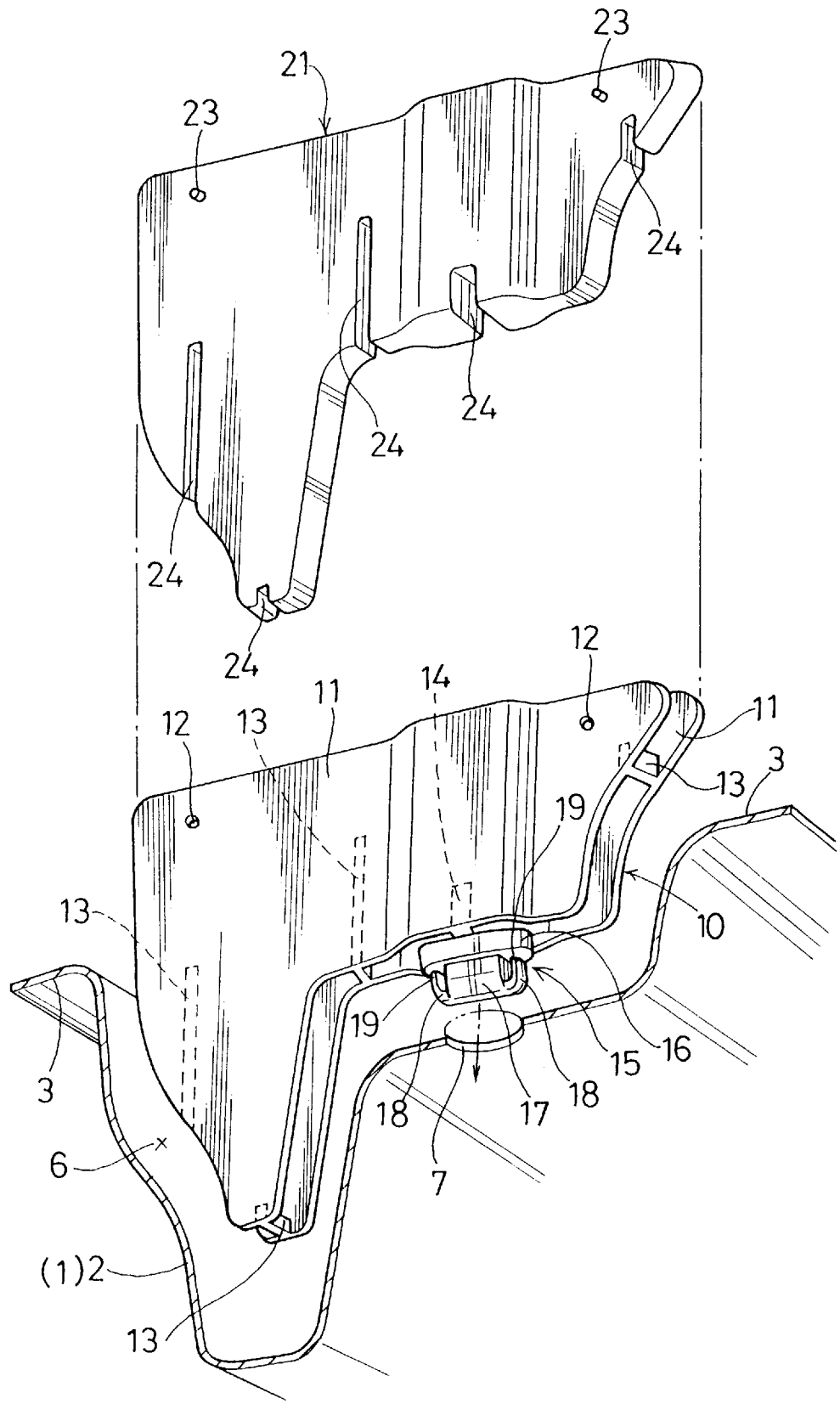
FIG. 1 is a perspective view of a support structure according to a first embodiment of the present invention, and in which a support member and a foamable material are shown in separated relation.
Figure 2:
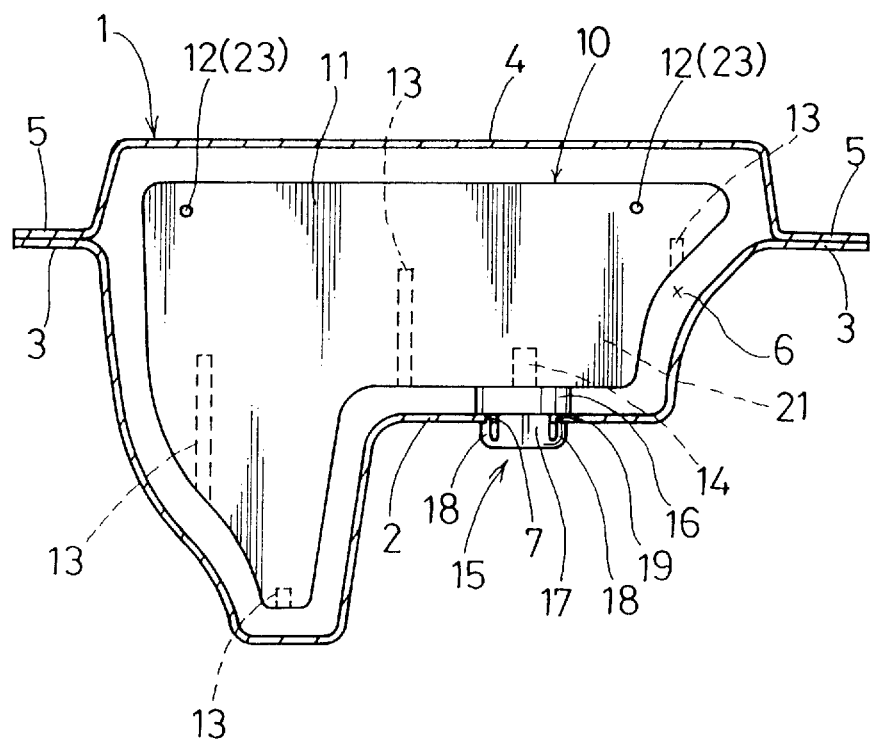
FIG. 2 is a side view of the support member and the foamable material as assembled and located in a cavity of a pillar.

Referring to FIGS. 1 to 4, shown therein is a first embodiment of the invention. As shown in FIGS. 1 and 2, a pillar 1 of a vehicle body is exemplified as a hollow structural member. As best shown in FIG. 2, the pillar 1 is constituted of an inner pillar panel 2 having a flange 3 and an outer pillar panel 4 having a flange 5. The inner and the outer pillar panels 2 and 4 are welded at the flanges 3 and 5 by spot welding to form the pillar 1 into a closed box-like hollow body including a cavity 6 therein. The inner pillar panel 2 is provided with an aperture 7 into which an engagement pin 15 is non-rotatably inserted, as will be hereinafter described. The aperture 7 has an elongated configuration, that is, an oval, rectangular or other non-circular configuration. The cavity 6 of the pillar 1 receives a foamable material 21 which blocks the cavity 6 when it is foamed and expanded by external heating. The foamable material 21 is retained by a support member 10 disposed in the cavity 6. The support member 10 is constituted of a pair of support plates 11 which are spaced apart by a desired distance to snugly receive the foamable material 21 therebetween.

The support plates 11 are disposed in the cavity 6 so as to be perpendicular to a longitudinal direction of the cavity 6. Also, the support plates 11 are configured substantially to conform to the transverse cross-sectional configuration of the cavity 6 and has an external dimension slightly smaller than the dimension of the cross section of the cavity 6. The support plates 11 are interconnected through spacers or connecting pieces 13 and 14 interposed in parallel therebetween. As will be recognized, the connecting pieces 13 and 14 are dimensioned to space apart the support plates 11 by the desired distance.

The engagement pin 15 is integrally formed on the peripheral edge of the support plates 11 so as to correspond to the aperture 7 formed on the inner pillar panel 2. In the illustrated embodiment, the engagement pin 15 is integrally formed on an outer end surface of the connecting piece 14 which is arranged to correspond to the aperture 7. The engagement pin 15 includes a base 16 which is greater than the aperture 7 in length and width, a leg 17 axially projected from a seating surface of the base 16 and preferably having an elongated cross-sectional configuration corresponding to the configuration of the aperture 7, and a pair of elastically deformable engagement lips 18 laterally projected from a projected end of the leg 17. Further, each engagement lip 18 includes a finger portion 19 which may elastically engage a longitudinal peripheral edge of the aperture 7 to prevent rotation and dropping out of the engagement pin 15 when the leg 17 is completely forced in the aperture 7.

In this embodiment, as shown in FIG. 1, the distance between the support plates 11 is partially increased at an area adjacent to the engagement pin 15 so as to be greater than the width of the base 16 of the engagement pin 15. Moreover, in this embodiment, the support plates 11, the connecting pieces 13 and 14, and the engagement pin 15 are integrally formed by injection molding of synthetic resin.

The foamable material 21 is made of a material which may be foamed and expanded to a foamed product 22 at a temperature from 110° C. to 190° C. The foamable material 21 is reasonably received between the support plates 11 in an unfoamed state.

The foamable material 21 is formed by injection molding or extrusion molding and shaped substantially to conform to the support plates 11 in configuration and external dimension. Further, the foamable material 21 has a thickness equal to or smaller than the distance between the support plates 11 so as to be snugly fitted therebetween.

Further, the foamable material 21 to be inserted between the support plates 11 has slits 24 which may engage with the connecting pieces 13 and 14 when it is received between the support plates 11.

The foamable material 21 used in this embodiment may be a foamabel material disclosed in Japanese Laid-Open Patent Publication No. 2-276836. The foamable material is foamed and cured at a temperature from 110° C. to 190° C. to provide a closed cell type foamed product.

The formulation of the foamable material as disclosed is set forth below, on a weight percent basis.

| | |
|---|---|
| Copolymer of ethylene and methyl acrylate MI 0.7, MA 15% by weight | 63.55 |
| LDPE (melting point 1.5° C. density 0.919) | 27.15 |
| 4,4'-di,tert butyl peroxy n-butyl valerate (Trigonox 29/40) | 0.63 |
| bis (tert butyl peroxy isopropyl) benzene (Perkadox 14/40) | 1.63 |
| benzene sulphonyl hydrazide (Cellogen OT) | 3.62 |
| Azodicarbonamide (Porofor ADC-K) | 1.81 |
| di-ethylene glycol (DEG) | 1.81 |

The Porofor component contains zinc which activates the blowing activity of the foamable material.

As will be recognized, the foamable material 21 is not restricted to the composition described above and may be various types of materials which can be foamed and expanded by heating.

Figure 3:
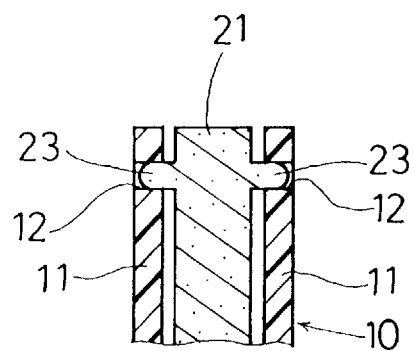
FIG. 3 is a fragmentary sectional view of the support member and the foamable material as assembled.

In this embodiment, as best shown in FIG. 3, the support plates 11 have desired numbers (shown as two for illustrative purposes) of small apertures 12. On the other hand, the foamable material 21 is provided with projections 23 engageable with the small apertures 12. The projections 23 cooperates with the small apertures 12 to suitably position and retain the foamable material 21 between the support plates 11.

Processes for incorporating the foamable material 21 to the pillar 1 and subsequent operations will now be described.

The foamable material 21 as unfoamed is previously positioned between the support plates 11 in which the projections 23 are engaged with the small apertures 12 while engaging the slits 24 with the connecting pieces 13 and 14. Thus, the foamable material 21 is properly positioned and retained on the support member 10.

The support member 10 with the foamable material 21 is introduced into the inner pillar panel 2, and the engagement pin 15 provided on the support plates 11 is inserted into the aperture 7 of the inner pillar panel 2. When the leg 17 of the engagement pin 15 is completely forced into the aperture 7, the finger portions 19 of the engagement lips 18 are engaged with the longitudinal peripheral edges of the aperture 7 to prevent rotation and dropping out of the engagement pin 15. Thus, the foamable material 21 is positioned on the inner pillar panel 2 together with the support member 10.

Subsequently, the inner and the outer pillar panels 2 and 4 are welded at the flanges 3 and 5 thereof by spot welding to form the pillar 1 having the closed box-like hollow shape and encapsulating the foamable material 21 therein.

Figure 4:
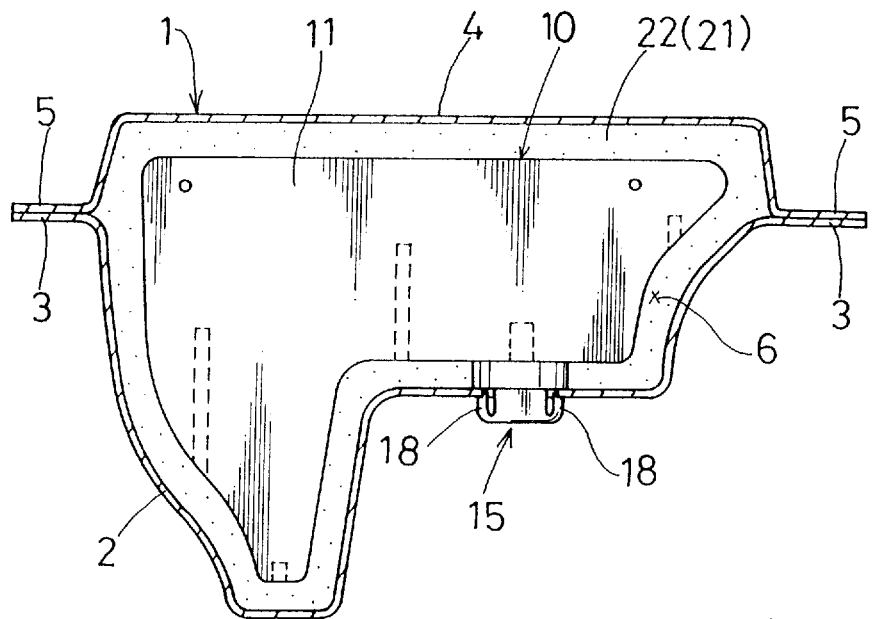
FIG. 4 is a side view of the support member and the foamable material as assembled and located in the cavity of the pillar after the foamable material is foamed and expanded.

Thereafter, the pillar 1 with the foamable material 21 is heated by external heating, for example, by external heating for baking finishing of the automobile body. Consequently, as shown in FIG. 4, the foamable material 21 is foamed and expanded to produce the foamed product 22.

When the foamable material 21 is foamed and expanded by heating, the support plates 11 prevent the formable material 21 from expanding in the longitudinal direction of the cavity 6, and this causes the foamable material 21 to be effectively foamed and expanded in directions perpendicular to the longitudinal direction of the cavity 6. This is because the foamable material 21 is retained between the support plates 11 arranged perpendicular to the longitudinal direction of the cavity 6 so that both side surfaces thereof are restrictively covered by the support plates 11. Therefore, the foamed product 22 thus produced is reliably adhered to an inner circumferential surface of the pillar 1. As a result, the cavity 6 is efficiently blocked by the foamed product 22.

Moreover, as previously described, the distance between the support plates 11 is partially increased at an area adjacent to the engagement pin 15 so as to be greater than the width of the base 16 of the engagement pin 15. Therefore, when the foamable material 21 is foamed and expanded, a part of the foamed product 22 as produced covers up the engagement pin 15 and closes the aperture 7. This may prevent entrance of water, dirt, dust and other matter into the cavity 6 through the aperture 7.

Referring now to FIGS. 5 to 9, shown therein is a second embodiment of the invention.

Figure 5:
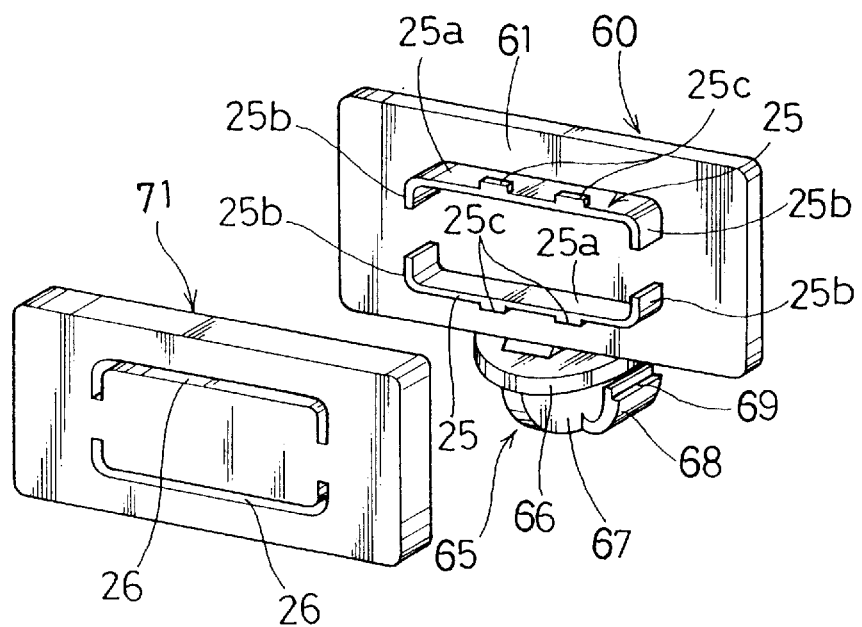
FIG. 5 is a perspective view of a support structure according to a second embodiment of the present invention, and in which a support member and a foamable material are shown in separated relation.
Figure 6:
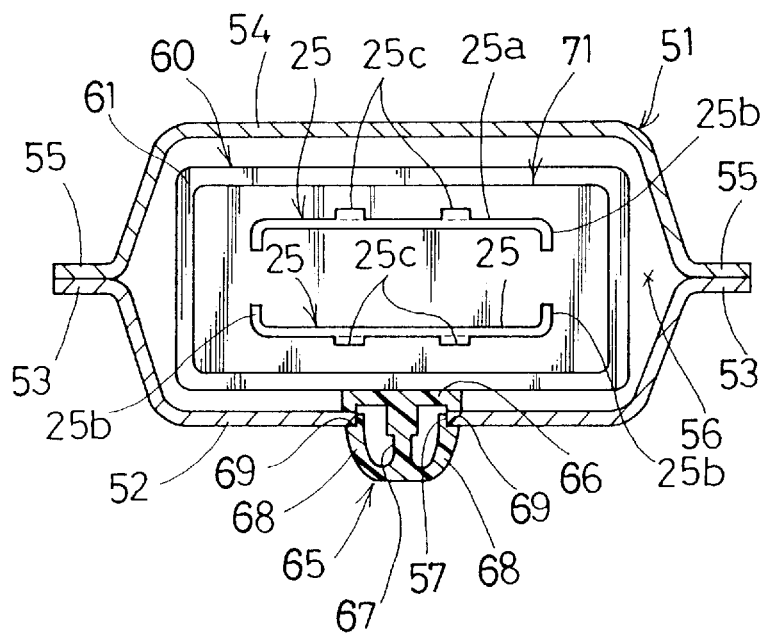
FIG. 6 is a side view of the support member of FIG. 5 and the foamable material as assembled and located in a cavity of a pillar.
Figure 7:
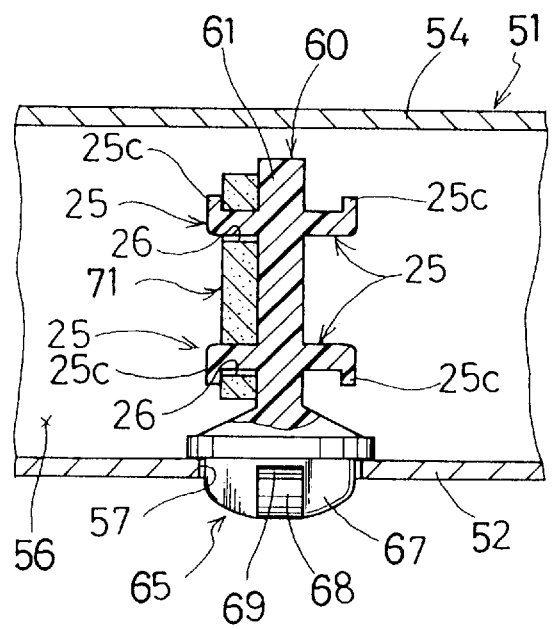
FIG. 7 is a sectional view of the support member of FIG. 5 and the foamable material as assembled and located in the cavity in which the foamable material is retained on one wall surface of the support member.

In this embodiment, as shown in FIGS. 5 to 7, a pillar 51 is constituted of an inner pillar panel 52 having a flange 53 and an outer pillar panel 54 having a flange 55. The inner and the outer pillar panels 52 and 54 are welded at the flanges 53 and 55 to form the pillar 51 including a cavity 56 therein. The inner pillar panel 52 is provided with an aperture 57 into which an engagement pin 65 is inserted. The cavity 56 of the pillar 51 receives a foamable material 71. The foamable material 71 is retained by a support member 60 disposed in the cavity 56. The support member 60 is constituted of a support plate 61 on which two pairs of support strips 25 are integrally provided. These pairs of support strips 25 are projected from opposed wall surfaces of the support plate 61, respectively, so that the foamable material 71 is positioned and retained on either one wall surface of the support plate 61. Further, these pairs of support strips 25 are substantially mirror images of one another about the support plate 61. Accordingly, only one of these pairs of support strips 25 will be explained hereinafter.

The support plate 61 is disposed in the cavity so as to be perpendicular to a longitudinal direction of the cavity 56. Also, the support plate 61 is configured substantially to conform to the transverse cross-sectional configuration of the cavity 56 and has an external dimension slightly smaller than the dimension of the cross section of the cavity 56.

As best shown in FIG. 5, the support strips 25 are substantially symmetrically oppositely arranged and laterally extended in a parallel relationship with each other on the wall surface of the support plate 61. Each support strip 25 includes a central planar section 25a and a pair of bent section 25b formed on lateral ends of the planar section 25a. Further, the planar section 25a of the support strip 25 includes a pair of spaced protrusions 25c provided on an outer surface thereof at an area adjacent to a distal end edge thereof.

The engagement pin 65 is integrally formed on the peripheral edge of the support plate 61 so as to correspond to the aperture 57 formed on the inner pillar panel 52. The engagement pin 65 includes a base 66 which is greater than the aperture 57 in length and width, a leg 67 axially projected from a seating surface of the base 66 and having an elongated cross-sectional configuration corresponding to the configuration of the aperture 57 in length, and a pair of elastically deformable engagement lips 68 laterally projected from a projected end of the leg 67. As shown in FIG. 7 for example, the leg 67 is longitudinally dimensioned to engage a longitudinal peripheral edge of the aperture 57 to prevent rotation of the engagement pin 65 when it is completely forced into the aperture 57. Further, as shown in FIG. 6 for example, each engagement lip 68 includes a finger portion 69 which may elastically engage a lateral peripheral edge of the aperture 57 to prevent dropping out of the engagement pin 65 when the leg 67 is completely forced into the aperture 57.

Moreover, the support plate 61, the support strips 25 and the engagement pin 65 are integrally formed by injection molding of synthetic resin.

The foamable material 71 to be retained on the support plate 61 is of the same material as that used in the first embodiment and conforms substantially to the support plate 61 in configuration and external dimension.

Further, as shown in FIG. 5, the foamable material 71 is formed with slots 26 each of which is configured and dimensioned to be closely engaged with the planar section 25a and the bent section 25b of the support strip 25 when it is applied to the support plate 61.

Processes for incorporating the foamable material 71 to the pillar 51 and subsequent operations will now be described.

The foamable material 71 is previously applied to one wall surface of the support plate 61 in which, as shown in FIG. 5, the slots 26 are engaged with the planar sections 25a and the bent sections 25b of the support strips 25. As will be appreciated, the planar section 25a and the bent section 25b may effectively prevent the foamable material 71 from two-dimensionally moving on the wall surface of the support plate 61. Further, the protrusions 25c formed on the planar section 25a may prevent the foamable material 71 from being dropped out. Thus, the foamable material 71 is properly positioned and reliably retained on the support member 60.

The support member 60 with the foamable material 71 is introduced into the inner pillar panel 52 and the engagement pin 65 provided on the support plate 61 is inserted into the aperture 57 of the inner pillar panel 52. When the leg 67 of the engagement pin 65 is sufficiently forced into the aperture 57, the leg 67 is engaged with the longitudinal peripheral edges of the aperture 57 to prevent rotation of the engagement pin 65, and also the finger portions 69 of the engagement lips 68 are engaged with the lateral peripheral edges of the aperture 57 to prevent dropping out of the engagement pin 65. Thus, the foamable material 71 is mounted on the inner pillar panel 52 together with the support member 60.

Figure 8:
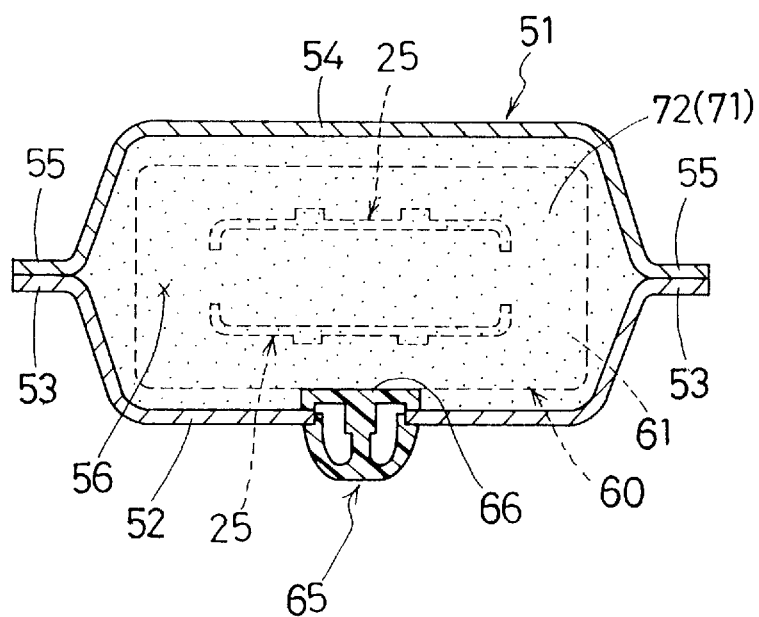
FIG. 8 is a side view of the support member of FIG. 5 and the foamable material as assembled and located in the cavity of the pillar after the foamable material is foamed and expanded.

Subsequently, the inner and outer pillar panels 52 and 54 are welded at the flanges 53 and 55 thereof by spot welding to form the pillar 51 encapsulating the foamable material 71 therein (FIG. 7). Thereafter, the pillar 51 with the foamable material 71 is heated by external heating. Consequently, as shown in FIG. 8, the foamable material 71 is foamed and expanded to produce the foamed product 72.

When the foamable material 71 is foamed and expanded by heating, the support plate 61 prevents the foamable material 71 from expanding in the longitudinal direction of the cavity 56 toward the support plate 61, thus restricting expansion of the foamable material in the longitudinal direction, and this causes the foamable material 71 to be effectively foamed and expanded in directions perpendicular to the longitudinal direction of the cavity 56. Therefore, the foamed product 72 thus produced is reliably adhered to an inner circumferential surface of the pillar 51.

Figure 9A:
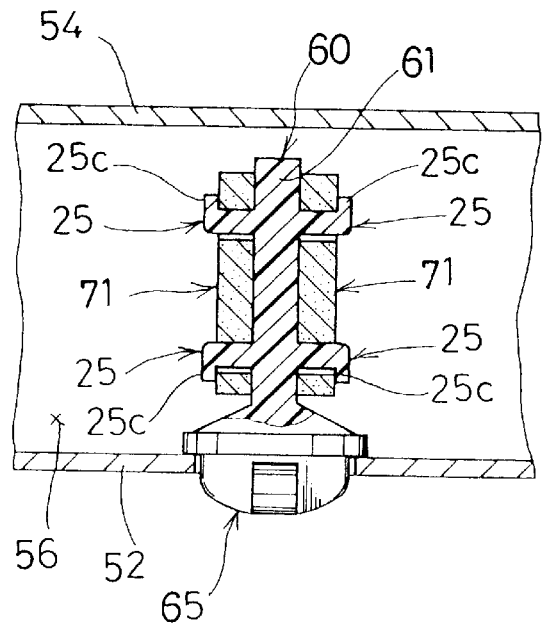
FIG. 9(A) is a sectional view of the support member of FIG. 5 and the foamable material as assembled and located in the cavity in which the foamable material is retained on the other wall surface of the support member.
Figure 9B:
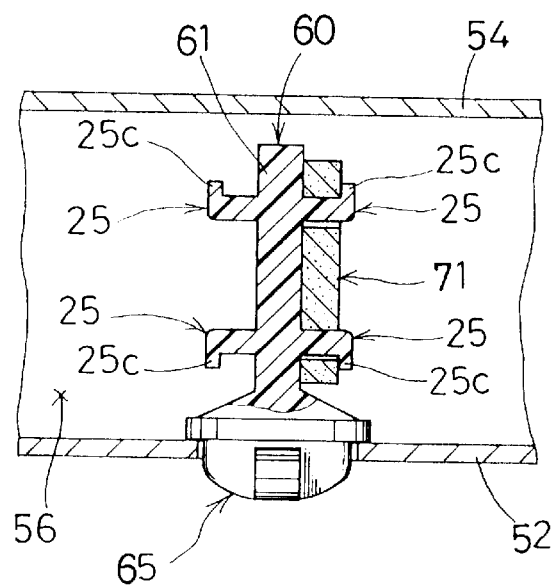
FIG. 9(B) is a sectional view of the support member of FIG. 5, the foamable material and an additional foamable material as assembled and located in the cavity in which the foamable materials are retained on respective wall surfaces of the support member.
Figure 10:
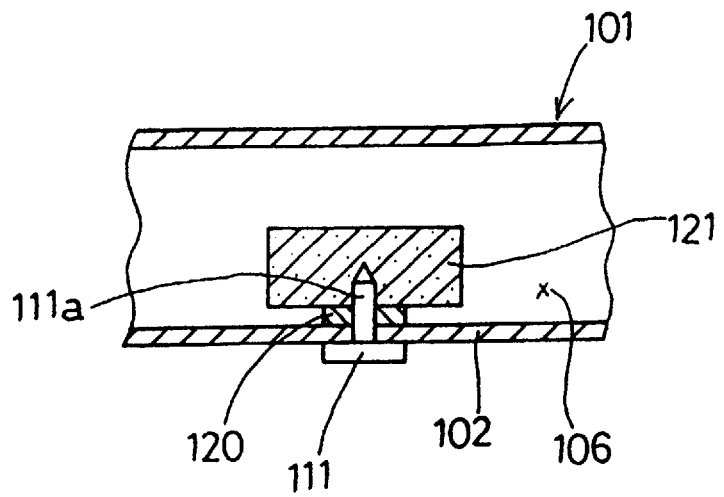
FIG. 10 is a sectional view showing a conventional support structure of a foamable material.
Figure 11:
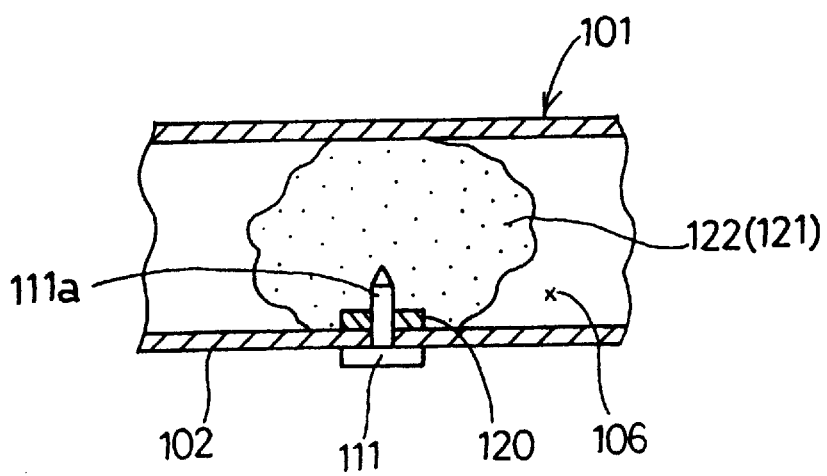
FIG. 11 is a sectional view showing the conventional support structure after the foamable material is foamed and expanded.

In this embodiment, as described above, the two pairs of support strips 25 are provided on the wall surfaces of the support plate 61, respectively. Therefore, as shown in FIG. 9(A), the foamable material 71 can be positioned and retained on the other wall surface of the support plate 61. Further, as shown FIG. 9(B), an additional foamable material 71 can be used so that the foamable materials 71 are retained on both wall surfaces of the support plate 61, if required.

Moreover, in the first and the second embodiments, the pillar of a vehicle body is exemplified as the hollow structural member. However, the hollow structural member is not limited to the pillar and may be a rocker panel or a roof side panel of a vehicle body. Further, the hollow structural member is not limited to parts of a vehicle body.

As apparent from the above description, according to the present invention, the foamable material is retained on the support member in a way that at least one side surface thereof is restrictively covered by the support member. The support member retaining the foamable material is disposed in the cavity of the hollow structural member so as to be perpendicular to the longitudinal direction of the cavity. Therefore, when the foamable material is foamed and expanded by external heating, the support member prevents the formable material from expanding in the longitudinal direction of the cavity, and this causes the foamable material to be effectively foamed and expanded in the directions perpendicular to the longitudinal direction of the cavity. As a result, the foamable material may efficiently block the cavity to increase damping powers and sound insulation powers of the hollow structural member without increasing the amount thereof.

Further, the support member for retaining the foamable material is disposed in the cavity of the hollow structural member only by inserting the engagement pin provided thereon into the aperture formed on the hollow structural member. Thus, the foamable material can be easily and reliably positioned in the cavity.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A support structure for supporting a foamable material in a cavity extending in a longitudinal direction in a hollow structural member of known transverse cross-section, comprising:

a support member comprising at least one wall having opposed surfaces and a shape corresponding to the known transverse cross-section, and adapted for placement transversely across the cavity with the at least one wall perpendicular to the longitudinal direction, said support member comprising at least one support strip projecting from at least one of said opposed surfaces in a longitudinal direction, and an engagement pin integrally provided on said support member and adapted to engage an aperture formed in the hollow structural member, said at least one wall substantially blocking expansion of foamable material received therealong in a longitudinal direction, and permitting expansion in a transverse direction such that the foamable material transversely blocks the hollow structural member when it is foamed by external heating, the foamable material forming at least one slot engaging said at least one support strip therein, and having a side surface engaged against at least one of said opposed surfaces.

2. The support structure as defined in claim 1, wherein said support member comprises a support plate, said at least one support strip being integral with said support plate and positioning and retaining the foamable material thereon.

3. The support structure as defined in claim 2, wherein said at least one support strip comprises at least two support strips, one on each of said opposed surfaces of said support member.

4. The support structure as defined in claim 1, wherein said support member comprises a pair of spaced support plates restrictively receiving the foamable material therebetween, and wherein said engagement pin is arranged between said support plates.

5. The support structure as defined in claim 1, wherein said support member and said engagement pin are integrally formed by injection molding of synthetic resin.

6. The support structure as defined in claim 1, wherein said aperture has a non-circular configuration to prevent the engagement pin from rotating therein.

7. The support structure as defined in claim 4, wherein the distance between said support plates is partially increased at an area adjacent to said engagement pin so as to be greater than the dimension of said engagement pin.

8. The support structure as defined in claim 4, wherein said support plates and the foamable material are provided with a desired number of small apertures and projections engageable with said small apertures to suitably position and retain the foamable material between said support plates.

* * * * *